United States Patent
Kim et al.

(10) Patent No.: US 10,104,089 B2
(45) Date of Patent: Oct. 16, 2018

(54) METHOD AND APPARATUS FOR PROVIDING SECURITY FUNCTION

(71) Applicant: Samsung Electronics Co., Ltd., Gyeonggi-do (KR)

(72) Inventors: Hyunsoo Kim, Yongin-si (KR); Jeonghun Kim, Hwaseong-si (KR); Jihyun Park, Seongnam-si (KR); Kyunghee Lee, Ansan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 14/715,813

(22) Filed: May 19, 2015

(65) Prior Publication Data

US 2015/0350207 A1 Dec. 3, 2015

(30) Foreign Application Priority Data

Jun. 2, 2014 (KR) .................. 10-2014-0066784

(51) Int. Cl.
*G06F 21/00* (2013.01)
*H04L 29/06* (2006.01)
*H04W 12/06* (2009.01)
*H04W 12/08* (2009.01)

(52) U.S. Cl.
CPC ............ *H04L 63/105* (2013.01); *H04L 63/08* (2013.01); *H04W 12/06* (2013.01); *H04W 12/08* (2013.01)

(58) Field of Classification Search
None
See application file for complete search history.

(56) References Cited

U.S. PATENT DOCUMENTS

| | | | |
|---|---|---|---|
| 7,474,592 B2 | 1/2009 | Lyon | |
| 2015/0042450 A1* | 2/2015 | McLear | G07C 9/00111 340/5.25 |
| 2015/0186636 A1* | 7/2015 | Tharappel | G06F 21/32 726/8 |
| 2015/0347738 A1* | 12/2015 | Ulrich | G06F 21/35 726/17 |
| 2016/0037345 A1* | 2/2016 | Margadoudakis | H04L 63/0853 455/411 |
| 2016/0037346 A1* | 2/2016 | Boettcher | H04M 1/72519 455/411 |

(Continued)

*Primary Examiner* — Jeffery Williams

(57) ABSTRACT

A method for providing a security function includes obtaining a request for executing a function of application through an electronic device if the electronic device is located within a predetermined distance from a user, identifying a success or failure of a first authentication which is previously performed for the user in response to the request, and determining whether to perform a second authentication for executing the function of the application based on the success or failure of the first authentication, wherein determining whether to perform the second authentication comprises performing the second authentication by using a security level lower than a security level related to the first authentication if the success of the first authentication is identified. An electronic device includes a processor configured to determine a success or failure of a first authentication, and decide whether to perform a second authentication with a second security level for executing the function.

18 Claims, 9 Drawing Sheets

(56) References Cited

U.S. PATENT DOCUMENTS

| | | | |
|---|---|---|---|
| 2016/0044445 A1* | 2/2016 | Hu | H04B 5/00 455/41.3 |
| 2016/0162672 A1* | 6/2016 | Grigg | G06F 21/32 726/7 |
| 2016/0174025 A1* | 6/2016 | Chaudhri | H04W 4/02 455/41.1 |
| 2016/0316363 A1* | 10/2016 | Li | H04W 12/04 |
| 2016/0379205 A1* | 12/2016 | Margadoudakis | G06Q 20/327 705/71 |
| 2017/0041789 A1* | 2/2017 | Waldron | H04W 12/06 |

\* cited by examiner

METHOD AND APPARATUS FOR PROVIDING SECURITY FUNCTION

CROSS-REFERENCE TO RELATED APPLICATION AND CLAIM OF PRIORITY

The present application is related to and claims the benefit under 35 U.S.C. § 119(a) of a Korean patent application filed on Jun. 2, 2014 in the Korean Intellectual Property Office and assigned Serial No. 10-2014-0066784, the entire disclosure of which is hereby incorporated by reference.

TECHNICAL FIELD

Various embodiments of the present disclosure relate to an electronic device, and more particularly, to a method and an apparatus for providing a security function.

BACKGROUND

Due to the remarkable development of the information and communication technology and the semiconductor technology, the spread and the use of portable electronic device has been rapidly increased. Recent electronic device has been developed into a mobile convergence device which does not stay in its own traditional area but covers other device area. Further, electronic device has been developed into various forms such as a wearable device that can be worn on user body, e.g., a device that can be worn on the wrist or a device in the form of glasses, as well as a device possessed by user such as a tablet computer, and a smart phone. The electronic device has been developed to have a high computing power compared to the related art, and may download application provided by various companies as well as application provided by the manufacturer of the portable electronic device to provide to the user. Accordingly, the electronic device may provide various services such as the mobile payment/stock transaction/Internet banking, web browsing, social network service (SNS), games, calendar, location-based service, or the like, through application. Electronic devices may provide various services including various security functions such as a password or a pattern code to the user in an environment in which security is maintained.

SUMMARY

To address the above-discussed deficiencies, it is a primary object to provide a method of unlocking by a user authentication in a lock state of the electronic device as a method for providing a security function. However, if the user authentication method for unlocking is set once by the user, the same user authentication method should be performed in every unlocking unless the setting is changed again by the user. For example, if the user authentication method for unlocking an electronic device set a password, the user may perform unlocking by inputting the password. When the electronic device is switched again to the lock state, the user should input the password again so as to unlock the electronic device. In such a conventional method, when user sets so complicated user authentication method, it is inconvenient in that the user should repeat the complicated method in every unlocking of the electronic device. In addition, when the user sets a simple user authentication method, the user may easily unlock the electronic device. However, for example, in the event of loss of the electronic device, someone may easily be able to unlock the electronic device, such that personal information may be leaked out by someone.

Various embodiments of the present disclosure may provide a method and an apparatus for providing a security function that can provide improved user convenience and security function by providing a user authentication method adjusted based on a user authentication result in the electronic device.

In accordance with an aspect of the present disclosure, a method includes: obtaining a request for executing a function of application through an electronic device, in a state in which the electronic device is located within a specified distance from user; determining success or failure of a first authentication which is previously performed for the user, in response to the request; and deciding whether to perform a second authentication for executing the function, based on the success or failure of the first authentication, wherein deciding whether to perform a second authentication may comprise performing the second authentication, by using a security level lower than the security level related to the first authentication, based on the success of the first authentication.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller", or "processor" means any device, system or part thereof that controls at least one operation, such a device may be implemented in hardware, firmware or software, or some combination of at least two of the same. It should be noted that the functionality associated with any particular controller or processor may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
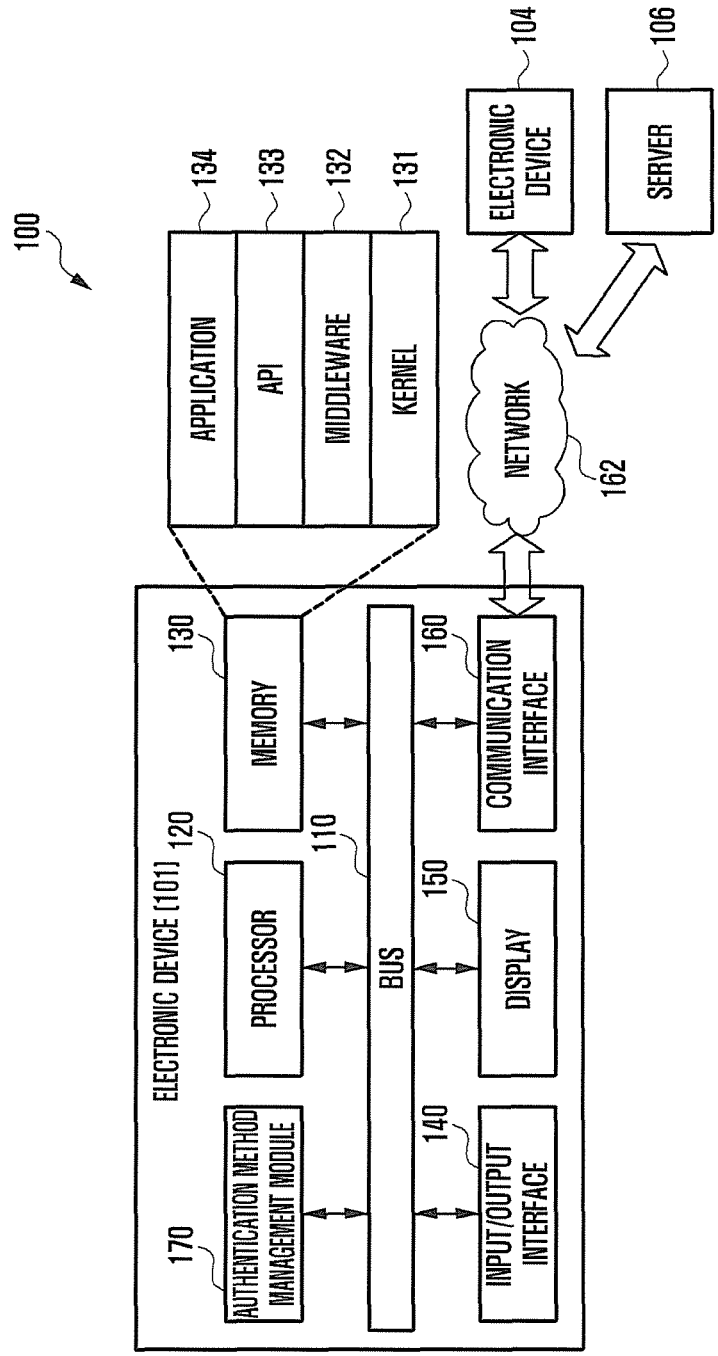
FIG. 1 illustrates a network environment including an electronic device according to various embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Prior to a description of embodiments of the present disclosure, 'security level' may be defined as a security grade specified by an application user according to a user authentication method corresponding to at least one function executed in an electronic device or by a designer's intention at a time of design.

According to an embodiment of the present disclosure, the method of adjusting a user authentication method in an electronic device may be applied to at least one or more applications (example: lock/unlock, contents (e.g., photo, music, document) execution (e.g., play), banking or payment service, and the like) executed in the electronic device or at least one function of application.

Hereinafter, exemplary embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an exemplification of the principles of the disclosure and is not intended to limit the disclosure to the specific embodiments illustrated. The same reference numbers are used throughout the drawings to refer to the same or like parts.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a TeleVision (TV), a Digital Video Disk (DVD) player, an audio device, various medical devices (for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

Hereinafter, an electronic device according to various embodiments of the present disclosure is illustrated with reference to the accompanying drawings. The term 'user' used in various embodiments of the present disclosure may refer to a person who uses an electronic device or a device (e.g., an artificial intelligence electronic device) that uses an electronic device.

FIG. 1 illustrates a network environment 100 including an electronic device 101 according to various embodiments of the present disclosure. Referring to FIG. 1, the electronic device 101 can include a bus 110, a processor 120, memory 130, an input-output interface 140, a display 150, a communication interface 160, and an authentication method management module 170.

The bus 110 can be a circuit which interconnects the above-described elements and delivers a communication (e.g., a control message) between the above-described elements.

The processor 120 can receive commands from the above-described other elements (e.g., the memory 130, input/output interface 140, the display module 150, the communication module 160, the authentication method management module 170, etc.) through the bus 110, can interpret the received commands, and can execute calculation or data processing according to the interpreted commands.

The memory 130 can store therein commands or data received from or created at the processor 120 or other elements (e.g., the input/output interface 140, the display 150, the communication interface 160, or the authentication method management module 170, etc.). The memory 130 can include programming modules such as a kernel 131, a middleware 132, an application programming interface (API) 133, and an application 134. Each of the programming modules can be composed of software, firmware, hardware, and any combination thereof.

The memory 130 according to an embodiment of the present disclosure can store a security level table. The security level table 161 can include a security level for each of at least one user authentication method. For example, the security level table can be set and stored as shown in the following Table 1.

| Security level | Authentication method |
|---|---|
| Security level 1 | Touch event: touch and drag, swipe, long touch |
| Security level 2 | Face recognition: recognition of eyes, face shape, nose shape, mouth shape |
| Security level 3 | Pattern recognition, PIN |
| Security level 4 | Password, login |
| Security level 5 | Certified authentication: mobile payment, stock, Internet banking |

Here, Table 1 is just an example according to an embodiment of the present disclosure, but the technical concept of the present disclosure is not limited thereto. In Table 1, the security level table illustrates security level 1 to security level 5, but the type of security level and the number of classification can be extended and reduced according to embodiments of the present disclosure. In addition, in Table 1, the user authentication methods corresponding to each security level can be changed according to embodiments of the present disclosure. For example, referring to Table 1, the electronic device can specify example user authentication methods from the lowest security level to the highest security level. For example, the electronic device can set the authentication method using a touch event to the lowest security level, security level 1. The electronic device can set the authentication method using a certified authentication to the highest security level, security level 5. Face recognition can be configured to security level 2, which is lower than the pattern recognition of security level 3, in view of the current technology level for face recognition. On the other hand, if the accuracy of face recognition is enhanced according to the technology development of relevant industries, the security level of the user authentication through the face recognition can be set to be higher than security level 2. Thus, the security level table in Table 1 is just an example according to one embodiment of the present disclosure, and the present disclosure is not limited to the security level table in Table 1.

The kernel 131 can control or manage system resources (e.g., the bus 110, the processor 120, or the memory 130, etc.) used for performing operations or functions of the other programming modules, e.g., the middleware 132, the API 133, or the application 134. Additionally, the kernel 131 can offer an interface that allows the middleware 132, the API 133 or the application 134 to access, control or manage individual elements of the electronic device 101.

The middleware 132 can perform intermediation by which the API 133 or the application 134 communicates with the kernel 131 to transmit or receive data. Additionally, in connection with task requests received from the applications 134, the middleware 132 can perform a control (e.g., scheduling or load balancing) for the task request by using technique such as assigning the priority for using a system resource of the electronic device 101 (e.g., the bus 110, the processor 120, or the memory 130, etc.) to at least one of the applications 134.

The API 133, an interface for allowing the application 134 to control a function provided by the kernel 131 or the middleware 132, can include, for example, at least one interface or function (e.g., a command) for a file control, a window control, an image processing, a text control, and the like.

According to embodiments, the application 134 can include an SMS/MMS application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 134 can be an application associated with an exchange of information between the electronic device 101 and any external electronic device (e.g., an external electronic device 104). This type application can include a notification relay application for delivering specific information to an external electronic device, or a device management application for managing an external electronic device.

For example, the notification relay application can include a function to deliver notification information created at any other application of the electronic device 101 (e.g., the SMS/MMS application, the email application, the health care application, or the environment information application, etc.) to an external electronic device (e.g., the electronic device 104). Additionally or alternatively, the notification relay application can receive notification information from an external electronic device (e.g., the electronic device 104) and offer it to a user. The device management application can manage (e.g., install, remove or update) a certain function (a turn-on/turn-off of an external electronic device (or some components thereof), or an adjustment of brightness (or resolution) of a display) of any external electronic device (e.g., the electronic device 104) communicating with the electronic device 101, a certain application operating at such an external electronic device, or a certain service (e.g., a call service or a message service) offered by such an external electronic device.

According to embodiments, the application 134 can include a specific application specified depending on attributes (e.g., a type) of an external electronic device (e.g., the electronic device 104). For example, in case an external electronic device is an MP3 player, the application 134 can include a specific application associated with a play of music. Similarly, in case an external electronic device is a portable medical device, the application 134 can include a specific application associated with a health care. In an embodiment, the application 134 can include at least one of an application assigned to the electronic device 101 or an application received from an external electronic device (e.g., the server 106 or the electronic device 104).

The input/output interface 140 can deliver commands or data, entered by a user through an input/output unit (e.g., a sensor, a keyboard, or a touch screen), to the processor 120, the memory 130, the communication interface 160, or the application control module 170 via the bus 110. For example, the input/output interface 140 can offer data about a user's touch, entered through the touch screen, to the processor 120. Also, through the input/output unit (e.g., a speaker or a display), the input/output interface 140 can output commands or data, received from the processor 120, the memory 130, the communication interface 160, or the application control module 170 via the bus 110. For example, the input/output interface 140 can output voice data, processed through the processor 120, to a user through the speaker.

The display 150 can display thereon various kinds of information (e.g., multimedia data, text data, etc.) to a user.

The communication interface 160 can perform a communication between the electronic device 101 and any external electronic device (e.g., the electronic device 104 of the server 106). For example, the communication interface 160 can communicate with any external device by being connected with a network 162 through a wired or wireless communication. A wireless communication can include, but not limited to, at least one of WiFi (Wireless Fidelity), BT (Bluetooth), NFC (Near Field Communication), GPS (Global Positioning System), or a cellular communication (e.g., LTE, LTE-A, CDMA, WCDMA, UMTS, WiBro, or GSM, etc.). A wired communication can include, but not limited to, at least one of USB (Universal Serial Bus), HDMI (High Definition Multimedia Interface), RS-232 (Recommended Standard 232), or POTS (Plain Old Telephone Service).

According to an embodiment, the network 162 can be a communication network, which can include at least one of a computer network, an internet, an internet of things, or a telephone network. According to an embodiment, a protocol (e.g., transport layer protocol, data link layer protocol, or physical layer protocol) for a communication between the electronic device 101 and any external device can be supported by at least one of the application 134, the API 133, the middleware 132, the kernel 131, or the communication interface 160.

According to an embodiment of the present disclosure, the server 106 can perform at least one of operations (or functions) implemented in the electronic device 101 to support the operation of the electronic device 101.

The authentication method management module 170 can obtain a request for executing the function of the application through the electronic device in a state in which the electronic device 101 is located within the specified distance from the user. The electronic device can determine the success of the first authentication previously performed for the user, in response to the request. The electronic device can determine whether to perform the second authentication for executing the function, based on the success of the first authentication. The operation of the determination can perform the second authentication by using a security level lower than the security level related to the first authentication.

Additional information for the authentication method management module 170 is provided through the following description of FIGS. 2 to 8.

Figure 2:
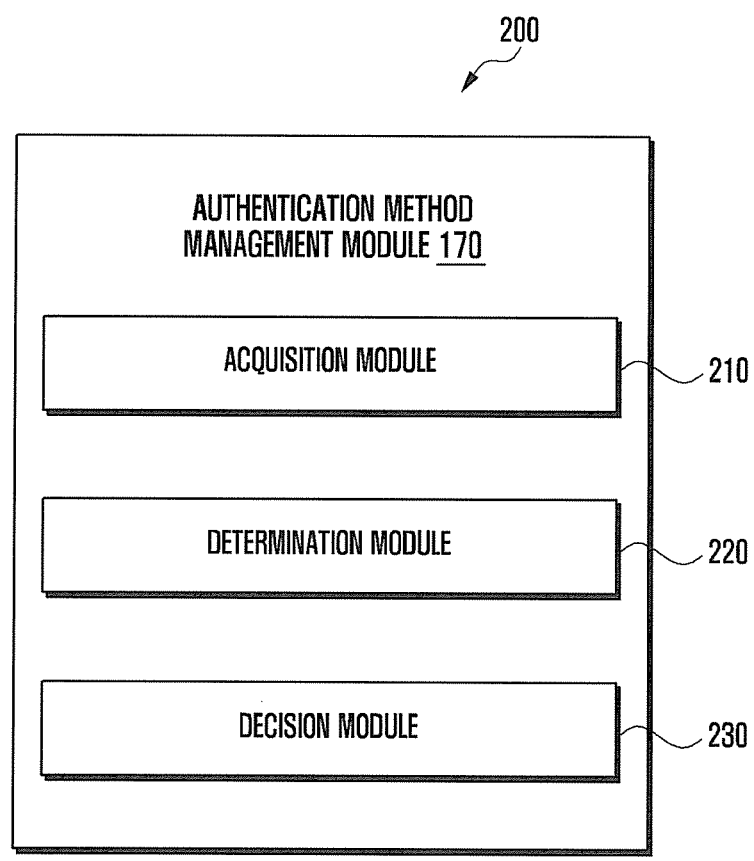
FIG. 2 illustrates a block diagram of an authentication method management module of an electronic device according to various embodiments of the present disclosure.

FIG. 2 illustrates a block diagram 200 of the authentication method management module 170 of an electronic device (e.g., the electronic device 101) according to various embodiments of the present disclosure.

FIG. 2 is a block diagram of the authentication method management module according to various embodiments of the present disclosure.

Referring to FIG. 2, at least part of the authentication method management module 170 can be included in a programming module or the processor 120, and can be configured of software, firmware, hardware, or a combination of at least two or more of them. The authentication method management module 170 can include an acquisition module 210, a determination module 220, and a decision module 230, and the like.

The acquisition module 210 can obtain a request for executing the function of application through the electronic device 100 in a state in which it is located within a specified distance from a user. In an embodiment of the present disclosure, the acquisition module 210 can obtain information detected from a sensor (e.g., at least one of a biometric sensor 240I, a proximity sensor 240G, a touch sensor (or a touch panel 252)), and the electronic device 100 can determine whether user is located within a specified distance from the electronic device 100 based on the obtained information.

In an embodiment of the present disclosure, when user wears the electronic device 100, the acquisition module 210 can receive biometric information such as user's body temperature, pulse, blood pressure, biological sound or temperature, and the like, detected through, for example, a biometric sensor (e.g., biometric sensor 240I) included in the electronic device 100. The electronic device 100 can determine whether the user wears the electronic apparatus 100 based on the biometric information received through the acquisition module 210.

In various embodiments of the present disclosure, when an object such as a user's finger approaches the electronic device 100 and is located within a specified distance, the acquisition module 210 can receive, for example, information related to a proximity-touch input (or, an indirect touch input or a hovering input) detected by using a proximity sensor (e.g., a proximity sensor (for example, a capacitive touch sensor)). The electronic device 100 can interpret the information related to the proximity-touch input received through the acquisition module 210, and determine that the user is located within a specified distance to the electronic device 100, when, for example, the intensity of proximity-touch input is a critical value (or a threshold) or more.

In various embodiments of the present disclosure, the electronic device 100 can determine whether the external electronic device 102, 104 is located within the specified distance from the electronic device 100 through the acquisition module 210. For example, the processor can determine whether the electronic device is paired (or to be paired) with the external electronic device 104 through Bluetooth (BT), WiFi-direct, and NFC included in a wireless communication module. The electronic device 100 can determine whether the external electronic device 104 is located within the specified distance, based on the intensity of Received Signal Strength Indicator (RSSI) of paired external electronic device 102, 104 through the acquisition module 210. In an embodiment of the present disclosure, the electronic device 100 can measure the intensity of the signal received from the external electronic device 102, 104 through the acquisition module 210, and the acquisition module 210 can determine that the external electronic device 102, 104 is located within the specified distance, when it is determined that the intensity of the measured signal is a specified value (or threshold) or more.

In addition, when the acquisition module 210 obtains a request for the execution of an application function, for example, if the user touches an icon (or an object or an item) and the like displayed through the display module, the processor can obtain a request for executing an application function that is mapped to the icon based on coordinate information corresponding to the touched icon.

Alternatively, the acquisition module 210 can receive a key input for the execution of an application function, and can obtain a request for the execution of an application function corresponding to the key. In an embodiment of the present disclosure, the acquisition module 210 can obtain a request for the execution of an application function without a separate input, when user is located within the specified distance to the electronic device 100. For example, when the user wears the electronic device 100, the acquisition module 210 can obtain (or receive) a request (or command) for the execution of locking function of the electronic device 100.

The determination module 220 can determine the success or failure of the user authentication (hereinafter, for convenience of illustration, a first authentication) performed for the application before the request of function execution for the application. The processor can control to store information related to the success or failure of the first authentication into, for example, a memory (e.g., memory 130), or the like. In addition, when the application function execution is requested, the determination module 220 can determine the success or failure for the first authentication by inquiring the memory.

In an embodiment of the present disclosure, when it is determined that the first authentication is successful, the determination module 220 can determine at least one of a user authentication method of the successful first authentication or a security level (hereinafter, for convenience of illustration, referred to as a success security level) corresponding to the user authentication method of the successful first authentication. For example, the determination module 220 can determine that the user authentication method of the performed first authentication is a pattern recognition method, and the first authentication has succeeded as user inputted a specified pattern. In addition, the determination module 220 can determine at least one of information indicating that the user authentication method of the first authentication is a pattern recognition method or information indicating that a success security level is security level 3 through a query to a security level table (e.g., a security level table in which security level is set as shown in Table 1).

According to various embodiments of the present disclosure, when it is determined that the first authentication fails, the determination module 220 can determine at least one of a user authentication method of the failed first authentication or a security level (hereinafter, for convenience of illustration, referred to as a failure security level) corresponding to the user authentication method of the first authentication. For example, the determination module 220 can determine at least one of information indicating that a first authentication method is a password input method and information indicating that a failure security level is security level 4 through a query to the security level table, when the first authentication method is the password input method, and the first authentication fails as user is not able to input the specified password.

In an embodiment of the present disclosure, when the electronic device 100 determines that the external electronic device (e.g., the electronic device 102, 104) is located within a specified distance from the electronic device (e.g., electronic device 100) through the determination module 220, the electronic device 100 can receive information related to the success of the first authentication for the application or the like performed in the external electronic device from the external electronic device.

The decision module 230 can decide whether to execute a function, based on the success of the first authentication. For example, the decision module 230 can compare the security level related to first authentication with the security level specified to an authentication (hereinafter, for convenience of illustration, referred to as a second authentication) for the application requested to execute function, based on the success or failure of first authentication. For example, when the first authentication is determined to be successful, the decision module 230 can compare the success security level of the first authentication with the security level specified in the second authentication. In an embodiment of the present disclosure, the specified security level can be a security level corresponding to the user authentication method specified as default in the application requested to execute function or a security level corresponding to the user authentication method currently set for the application requested to execute function. In other words, when the user authentication is performed, the security level for the application requested to execute function can be accumulated and changed according to the success or failure of the performed user authentication. In more detail, when the setting of the electronic device 100 is initialized, if the security level for the application requested to execute function is defined as a default security level, specified security level can be changed from the default security level to various security levels, according to the success or failure of the subsequently performed user authentication.

The decision module 230 can decide whether to perform the second authentication, based on the comparison result of the security level. The decision module 230 can compare the security level related to first authentication with the specified security level, and can adjust (or change) the security level specified to the second authentication, in addition to the performing of the second authentication. A detailed description will be given with reference to a flowchart which will be described later.

According to various embodiments of the present disclosure, the electronic device (e.g., the electronic device 100) can include, in a state in which it is located within a specified distance from user, an acquisition module (e.g., the acquisition module 210) to obtain a request to execute a function of the application through the electronic device, a determination module (e.g., the determination module 220) to determine the success or failure of the first authentication which is previously performed for the user, in response to the request, and a decision module (e.g., the decision module 230) to decide whether to perform a second authentication for executing the function, based on the success or failure of the first authentication, wherein the decision module 230 can perform the second authentication by using the security level lower than the security level related to first authentication, based on the success of the first authentication.

According to various embodiments of the present disclosure, the acquisition module 210 can obtain the request in a state in which the electronic device 100 is worn by the user.

According to various embodiments of the present disclosure, the determination module 220 can receive success or failure from the external device 102, 104 for the electronic device 100.

According to various embodiments of the present disclosure, the determination module 220 can obtain the success or failure of the first authentication which is performed through the external electronic device 102, 104 in a state in which the electronic device and the external device 102, 104 for the electronic device 100 are paired.

According to various embodiments of the present disclosure, the decision module 230 can perform the second authentication by using the low security level on the bases of the success of the first authentication, in a state in which the electronic device 100 and the external device 102, 104 are paired.

According to various embodiments of the present disclosure, the decision module 230 can perform the second authentication by using the security level specified to the function in a state in which the electronic device 100 and the external device 102, 104 are not paired.

According to various embodiments of the present disclosure, the decision module 230 can perform the second authentication by using the security level higher than or equal to the security level related to first authentication, on the bases of the fail of the first authentication.

Figure 3:
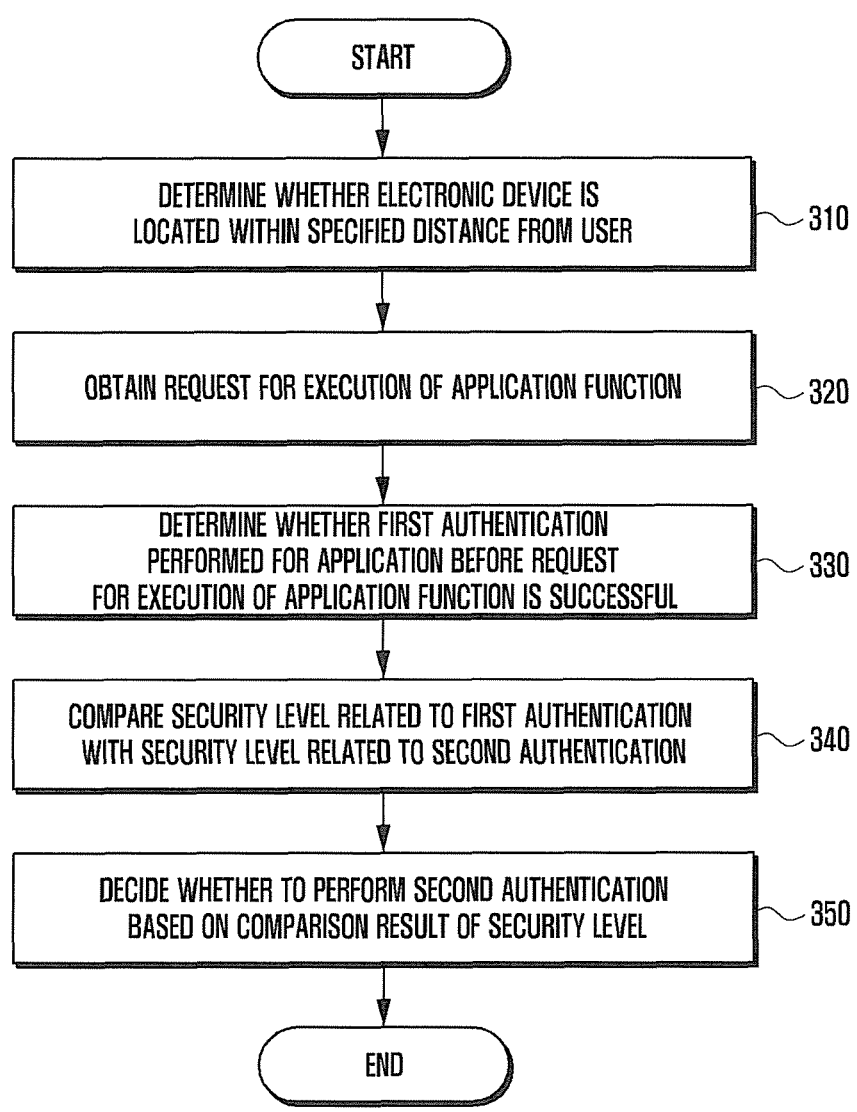
FIG. 3 is a flowchart illustrating a method for providing a security function according to an embodiment of the present disclosure.

FIG. 3 is a flowchart illustrating a method for providing a security function according to an embodiment of the present disclosure.

Referring to FIG. 3, at operation 310, an electronic device (e.g., the acquisition module 210) can determine whether an electronic device (e.g., electronic device 100) is located within a specified distance from user. If user is located within the specified distance from the electronic device, the electronic device can receive, for example, information detected from a sensor (for example, the sensor module 240 (e.g., at least one of biometric sensor, proximity sensor, or touch sensor (or touch panel)). The electronic device can determine whether the user is located within the specified distance from the electronic device based on the detected information.

In an embodiment of the present disclosure, when user wears an electronic device (e.g., the electronic device 100), the electronic device (e.g., the acquisition module 210) can receive biometric information, such as user's body temperature, pulse, blood pressure, biological sound or temperature, and the like, detected through, for example, a biometric sensor included in the electronic device. The electronic device can determine whether user wears the electronic device based on the received biometric information.

In an embodiment of the present disclosure, in a state in which user wears an electronic device (e.g., the electronic device 100), when it is determined that the electronic device belongs to specified user based on biometric information, the electronic device (e.g., the acquisition module 210) can adjust to minimize (or release security) the security level for a lock function as at least one function set to the electronic device (e.g., the electronic device 100). For example, the electronic device can compare the biometric information received from, for example, a biometric sensor (e.g., the biometric sensor) and specified user's biometric information stored in a memory (e.g., the memory 130). Based on the comparison result, when it is determined that the compared information are identical, the electronic device (e.g., the acquisition module 210) can determine that the user who wears an electronic device (e.g., the electronic device 100) is specified user. When it is determined that the determined user uses the electronic device (e.g., the electronic device is turned-on or the execution information related to application is inputted), the electronic device (e.g., the acquisition module 210) can control to release a lock set to the electronic device.

In an embodiment of the present disclosure, when an object such as a user's finger approaches an electronic device (e.g., the electronic device 100) and is located within a specified distance, an electronic device (e.g., the acquisition module 210) can receive, for example, information related to a proximity-touch input (or, an indirect touch input or a hovering input) detected by using a proximity sensor (e.g., a proximity sensor (e.g., a capacitive touch sensor)). The electronic device can interpret the information related to the received proximity-touch input and determine that the user is located within a specified distance from the electronic device 100, when, for example, the intensity of proximity-touch input is a critical value (or a threshold) or more.

In an embodiment of the present disclosure, the operation of determining that user is located within a specified distance to the electronic device is not limited to the above description. Based on various information received from various sensors, instruments or devices, the electronic device (e.g., the acquisition module 210) can determine that the user is located within a specified distance from an electronic device (e.g., the electronic device 100).

At operation 320, an electronic device (e.g., the acquisition module 210) can obtain a request for the execution of an application function. For example, if the user touches an icon (or an object or an item) and the like displayed through a display (e.g. the display module 150) included in an electronic device (e.g., the electronic device 100), the electronic device can obtain a request for executing an application function which is mapped to the icon based on coordinate information corresponding to the touched icon. Alternatively, an electronic device can receive a key input for the execution of an application function, and can obtain a request for the execution of an application function corresponding to the key. In an embodiment of the present disclosure, an electronic device (e.g., the acquisition module 210) can obtain a request for the execution of an application function without a separate input, when user is located within a specified distance to an electronic device (e.g., the electronic device 100). For example, when the user wears an electronic device, an electronic device (e.g., the acquisition module 210) can obtain (or receive) a request (or command) for the execution of locking function of the electronic device.

At operation 330, an electronic device (e.g., the determination module 220) can determine whether the user authentication (hereinafter, for convenience of illustration, a first authentication) performed for application before request for execution of application function is successful.

In an embodiment of the present disclosure, when the electronic device performs the first authentication with respect to an application, the first authentication can be successful or fail. The electronic device can store information related to the success or failure of the first authentication into, for example, a memory (e.g., the memory 130). When the function execution for application is requested, the electronic device can determine the success or failure for the first authentication by inquiring, for example, a memory (e.g., the memory 130) operatively coupled to the electronic device.

According to an embodiment of the present disclosure, when it is determined that the first authentication is successful, an electronic device (e.g., the determination module 220) can determine at least one of a user authentication method of the successful first authentication or a security level (hereinafter, for convenience of illustration, referred to as a success security level) corresponding to the user authentication method of the successful first authentication. For example, when the user authentication method of the performed first authentication is a pattern recognition method, and the first authentication has succeeded as user inputted a specified pattern, the electronic device can determine at least one of information indicating that the user authentication method of the first authentication is a pattern recognition method or information indicating that a success security level is security level 3 through a query to a security level table (e.g., a security level table in which security level is set as shown in Table 1).

According to various embodiments of the present disclosure, when it is determined that the first authentication fails, an electronic device (e.g., the determination module 220) can determine at least one of a user authentication method of the failed first authentication or a security level (hereinafter, for convenience of illustration, referred to as a failure security level) corresponding to the user authentication method of the first authentication. For example, when the first authentication method is the password input method, and the first authentication fails as user is not able to input the specified password, the electronic device can determine at least one of information indicating that a first authentication method is a password input method and information indicating that a failure security level is security level 4 through a query to the security level table.

The method for providing a security function according to an embodiment of the present disclosure can include not only a case in which the application requested to execute function and the application that performed the first authentication are identical, but also a case of being different. For example, if the application requested to execute function is a photo-related application to which security is set, the application that performed the first authentication can be a photo-related application to which security is set or a lock function-related application.

At operation 340, an electronic device (e.g., the decision module 230) can compare the security level (e.g., success security level or failure security level) related to the first authentication with the security level specified to an authentication (hereinafter, for convenience of illustration, referred to as a second authentication) for the application requested to execute function, based on the success or failure of first authentication. For example, when the first authentication is determined to be successful in an electronic device (e.g., the determination module 220), an electronic device (e.g., the decision module 230) can compare the success security level of the first authentication with the security level specified in the second authentication. When it is determined that the first authentication fails in an electronic device, an electronic device can compare the failure security level of the first authentication with the security level specified in the second authentication.

In an embodiment of the present disclosure, the specified security level can be a security level corresponding to the user authentication method specified as default in the application requested to execute function or a security level corresponding to the user authentication method currently set for the application requested to execute function. According to an embodiment of the present disclosure, when user authentication is performed in an electronic device, the security level for the application requested to execute function can be accumulated (or added) and changed according to the success or failure of the performed user authentication. For example, when the setting of electronic device is initialized, if the security level for the application requested to execute function is defined as a default security level, specified security level can be changed from the default security level to various security levels, according to the success or failure of the subsequently performed user authentication. For example, when the default security level of certain application is set as security level 3, the security level can be changed from security level 3 to security level 4 or security level 2.

At operation 350, an electronic device (e.g., the decision module 230) can decide whether to perform the second authentication, based on the comparison result of the security level. In detail, an electronic device can compare the security level related to first authentication with the specified security level, and can adjust (or change) the security level specified to the second authentication, in addition to the performing of the second authentication.

In an embodiment of the present disclosure, if it is determined that the first authentication is successful in an electronic device (e.g., the determination module 220), and the success security level of the first authentication is higher than or equal to the specified security level of the second authentication, an electronic device (e.g., the decision module 230) can change the specified level of the second authentication to be lower than the current specified level of the second authentication.

For example, if an electronic device determines that the first authentication is successful, and the success security level of the first authentication is security level 4 and the specified security level of the second authentication is security level 3, the electronic device can change the specified security level of the second authentication from security level 3 to security level 2. In this case, the electronic device can control to perform the second authentication by using the user authentication method corresponding to the security level 2.

In an embodiment of the present disclosure, if it is determined that the first authentication is successful, and the success security level of the first authentication is higher than or equal to the specified security level of the second authentication, an electronic device may not perform the second authentication. For example, if an electronic device determines that the first authentication is successful, and the success security level of the first authentication is security level 3 and the specified security level of the second authentication is security level 3, electronic device can determine that the user authentication method specified to the security level 2 is successful. In this case, electronic device can control to perform an application requested to execute function, not to perform the second authentication.

In an embodiment of the present disclosure, if an electronic device determines that the first authentication is successful, and the success security level of the first authentication is lower than the specified security level of the second authentication, an electronic device can perform the second authentication by using the user authentication method specified to the second authentication.

In an embodiment of the present disclosure, if it is determined that the first authentication fails, and the failure security level of the first authentication is lower than or equal to the specified security level of the second authentication, an electronic device can change the specified security level of the second authentication to be higher than the specified security level of the second authentication. For example, if an electronic device determines that the first authentication fails, and the success security level of the first authentication is security level 3 and the specified security level of the second authentication is security level 4, an electronic device can change the specified security level of the second authentication from security level 4 to security level 5. Accordingly, an electronic device can control to perform second authentication by using the user authentication method corresponding to the security level 5. The above mentioned embodiments of the present disclosure are just an example. If an electronic device determines that the first authentication fails, and the failure security level of the first authentication is lower than or equal to the specified security level of the second authentication, an electronic device can maintain the specified security level of the second authentication. An electronic device can control to perform the second authentication through the user authentication method specified to the second authentication.

In an embodiment of the present disclosure, if an electronic device determines that the first authentication fails, and the failure security level of the first authentication is higher than the specified security level of the second authentication, an electronic device can decide to maintain the specified security level of the second authentication. For example, if an electronic device determines that the first authentication fails, and the failure security level of the first authentication is security level 4 and the specified security level of the second authentication is security level 3, an electronic device can decide to maintain the specified security level of the second authentication. Accordingly, an electronic device can control to perform the second authentication through the user authentication method specified to the second authentication.

Although not shown in FIG. 3, in an embodiment of the present disclosure, if an electronic device (e.g., the electronic device 100) is not located within a specified distance from user, an electronic device (authentication method management module 170) can decide to return the security level of application to a default security level. For example, if user detaches a wearing electronic device, an electronic device can decide to return the security level of application to a default security level at the time of setting by user or at the time of design by designer. In an embodiment of the present disclosure, when an electronic device is changed from a turn-on state to a turn-off state, an electronic device can decide to return the security level of application to a default security level.

Figure 4:
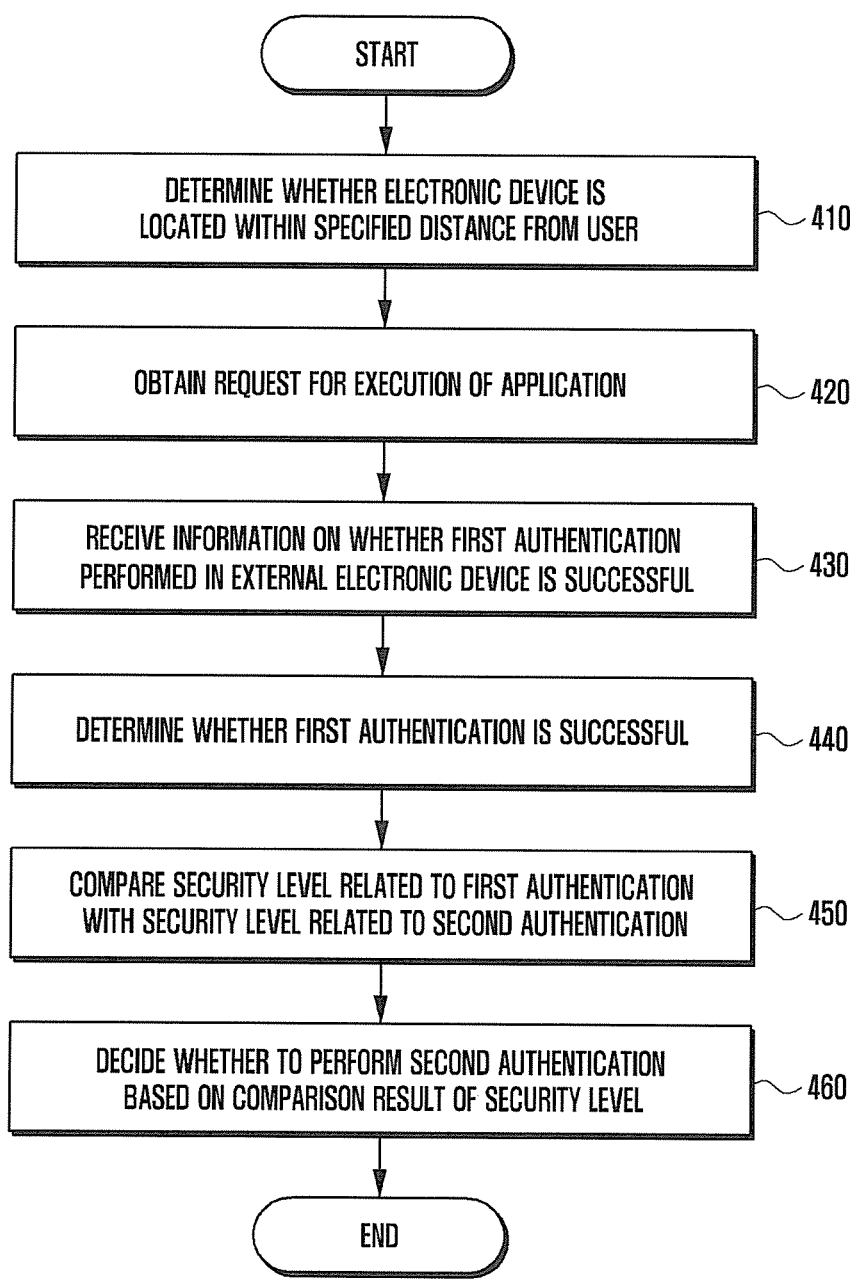
FIG. 4 is a flowchart illustrating a method for providing a security function according to various embodiments of the present disclosure.

FIG. 4 is a flowchart illustrating a method for providing a security function according to various embodiments of the present disclosure.

Referring to FIG. 4, at operation 410, an electronic device (e.g., the acquisition module 210) can deter mine whether an electronic device (e.g., electronic device 100) is located within a specified distance from user. At operation 420, an electronic device can obtain a request for the execution of an application function. Since the operation 410 and the operation 420 are overlapped with the operation 310 and the operation 320, a detailed description is omitted.

At operation 430, an electronic device (e.g., the acquisition module 210) can information on whether first authentication performed in an external electronic device (e.g., the electronic device 102, 104) is successful, from the external electronic device located within a specified distance. In an embodiment of the present disclosure, an electronic device (e.g., the acquisition module 210) can determine whether an external electronic device is located within a specified distance from the electronic device. For example, an electronic device can determine whether the electronic device is paired (or to be paired) with the external electronic device through, for example, a wireless communication module (e.g., Bluetooth (BT), WiFi-direct, and NFC). An electronic device can determine whether the external electronic device is located within specified distance, based on the intensity of Received Signal Strength Indicator (RSSI) received from the paired external electronic device. For example, an electronic device can measure the intensity of the signal received from external electronic device, and can determine that the external electronic device is located within specified distance, when it is determined that the intensity of the measured signal is a specified value (or threshold) or more.

In an embodiment of the present disclosure, when it is determined that an external electronic device (e.g., the electronic device 102, 104) is located within a specified distance from an electronic device (the electronic device 100), an electronic device (e.g., the determination module 220) can receive information related to the success or failure of the first authentication of the application or the like performed in the external electronic device from the external electronic device.

At operation 440, an electronic device can determine the success or failure of the first authentication, based on the information related to the success or failure of the first authentication received from the external electronic device. In an embodiment of the present disclosure, when it is determined that the first authentication performed in the external electronic device is successful, an electronic device can determine at least one of the user authentication method of successful first authentication, and the security level corresponding to the user authentication method of the first authentication. For example, when it is determined that the user authentication method performed in the external electronic device is a pattern recognition method, and the first authentication is successful, an electronic device can determine at least one of information indicating that the user authentication method of the first authentication is a pattern recognition method or information indicating that a success security level is security level 5 through a query to a security level table (e.g., a security level table in which security level is set as shown in Table 1).

According to various embodiments of the present disclosure, when it is determined that the first authentication performed in an external electronic device (e.g., the electronic device 102, 104) fails, an electronic device (e.g., the determination module 220) can determine at least one of a user authentication method of the failed first authentication or a security level (hereinafter, for convenience of illustration, referred to as a failure security level) corresponding to the user authentication method of the first authentication. For example, an electronic device can determine at least one of information indicating that a first authentication method is a password input method and information indicating that a failure security level is security level 4 through a query to the security level table, when it is determined that the user authentication method of first authentication is the password input method, and the first authentication fails.

The method for providing a security function according to an embodiment of the present disclosure can include the case in which the application requested to execute function is different from the application that performed the first authentication in the external electronic device (e.g., the electronic device 102, 104), as well as the case of being identical.

At operation 450, an electronic device (e.g., the decision module 230) can compare the security level related to first authentication (e.g., success security level or failure security level) with the security level specified to an authentication (hereinafter, for convenience of illustration, referred to as a second authentication) for the application requested to execute function, based on the success or failure of first authentication performed in the external electronic device (e.g., the electronic device 102, 104). For example, when the first authentication is determined to be successful, an electronic device can compare the success security level of the first authentication with the security level specified in the second authentication. Alternatively, when it is determined that the first authentication fails, an electronic device can compare the failure security level of the first authentication with the security level specified in the second authentication. In an embodiment of the present disclosure, the specified security level can be a security level corresponding to the user authentication method specified as default in the application requested to execute function or a security level corresponding to the user authentication method currently set for the application requested to execute function. In other words, when the user authentication is performed, the security level for the application requested to execute function can be accumulated and changed according to the success or failure of the performed user authentication. When the setting of electronic device is initialized, if the security level for the application requested to execute function is defined as a default security level, specified security level can be changed from the default security level to various security levels, according to the success or failure of the subsequently performed user authentication. For example, if the default security level for a certain application is set to security level 3, the security level can be changed from, for example, security level 3 to security level 4 or security level 2, depending on the success or failure of user authentication.

At operation 460, an electronic device (e.g., the decision module 230) can decide whether to perform the second authentication, based on the comparison result of the security level. The electronic device can compare the security level related to first authentication with the specified security level, and can adjust (or change) the security level specified to the second authentication, in addition to the performing of the second authentication.

In an embodiment of the present disclosure, if it is determined that the first authentication is successful, and the success security level of the first authentication is higher than or equal to the specified security level of the second authentication, an electronic device can change the specified level of the second authentication to be lower than the current specified level of the second authentication. For example, if an electronic device determines that the first authentication is successful, and the success security level of the first authentication is security level 4 and the specified security level of the second authentication is security level 3, electronic device can change the specified security level of the second authentication from security level 3 to security level 2. Accordingly, electronic device can control to perform the second authentication by using the user authentication method corresponding to security level 2.

In an embodiment of the present disclosure, if it is determined that the first authentication is successful, and the success security level of the first authentication is higher than or equal to the specified security level of the second authentication, an electronic device (e.g., the decision module 230) may not perform the second authentication. For example, if an electronic device determines that the first authentication is successful, and the success security level of the first authentication is security level 3 and the specified security level of the second authentication is security level 3, electronic device can determine that the user authentication method specified to the security level 2 is successful. In this case, electronic device can control to perform an application requested to execute function, not to perform the second authentication.

In an embodiment of the present disclosure, if an electronic device determines that the first authentication is successful, and the success security level of the first authentication is lower than the specified security level of the second authentication, electronic device can perform the second authentication by using the user authentication method specified to the second authentication.

In an embodiment of the present disclosure, if an electronic device (e.g., the decision module 230) determines that the first authentication fails, and the failure security level of the first authentication is lower than or equal to the specified security level of the second authentication, electronic device can change the specified security level of the second authentication to be higher than the specified security level of the second authentication. For example, if an electronic device determines that the first authentication fails, and the success security level of the first authentication is security level 3 and the specified security level of the second authentication is security level 4, electronic device can change the specified security level of the second authentication from security level 4 to security level 5.

Accordingly, an electronic device can control to perform second authentication by using the user authentication method corresponding to the security level 5. It is just an example, and if an electronic device determines that the first authentication fails, and the failure security level of the first authentication is lower than or equal to the specified security level of the second authentication, electronic device can maintain the specified security level of the second authentication. In other words, electronic device can control to perform the second authentication through the user authentication method specified to the second authentication.

In an embodiment of the present disclosure, if electronic device determines that the first authentication fails, and the failure security level of the first authentication is higher than the specified security level of the second authentication, electronic device can decide to maintain the specified security level of the second authentication. For example, if electronic device determines that the first authentication fails, and the failure security level of the first authentication is security level 5 and the specified security level of the second authentication is security level 3, electronic device can decide to maintain the specified security level of the second authentication. Accordingly, electronic device can control to perform the second authentication through the user authentication method specified to the second authentication.

Although not shown in FIG. 4, in an embodiment of the present disclosure, if an external electronic device (e.g., the electronic device 102, 104) is not located within a specified distance from an electronic device, an electronic device (e.g., authentication method management module 170) can decide to return the security level of application to a default security level. For example, if external electronic device is located beyond a specified distance (e.g., if the intensity of the signal received from external electronic device is a specified value or less, or if pairing with external electronic device is released), electronic device (e.g., authentication method management module 170) can decide to return the security level of application or the like stored in electronic device (e.g., the electronic device 100) to a default security level.

Figure 5:
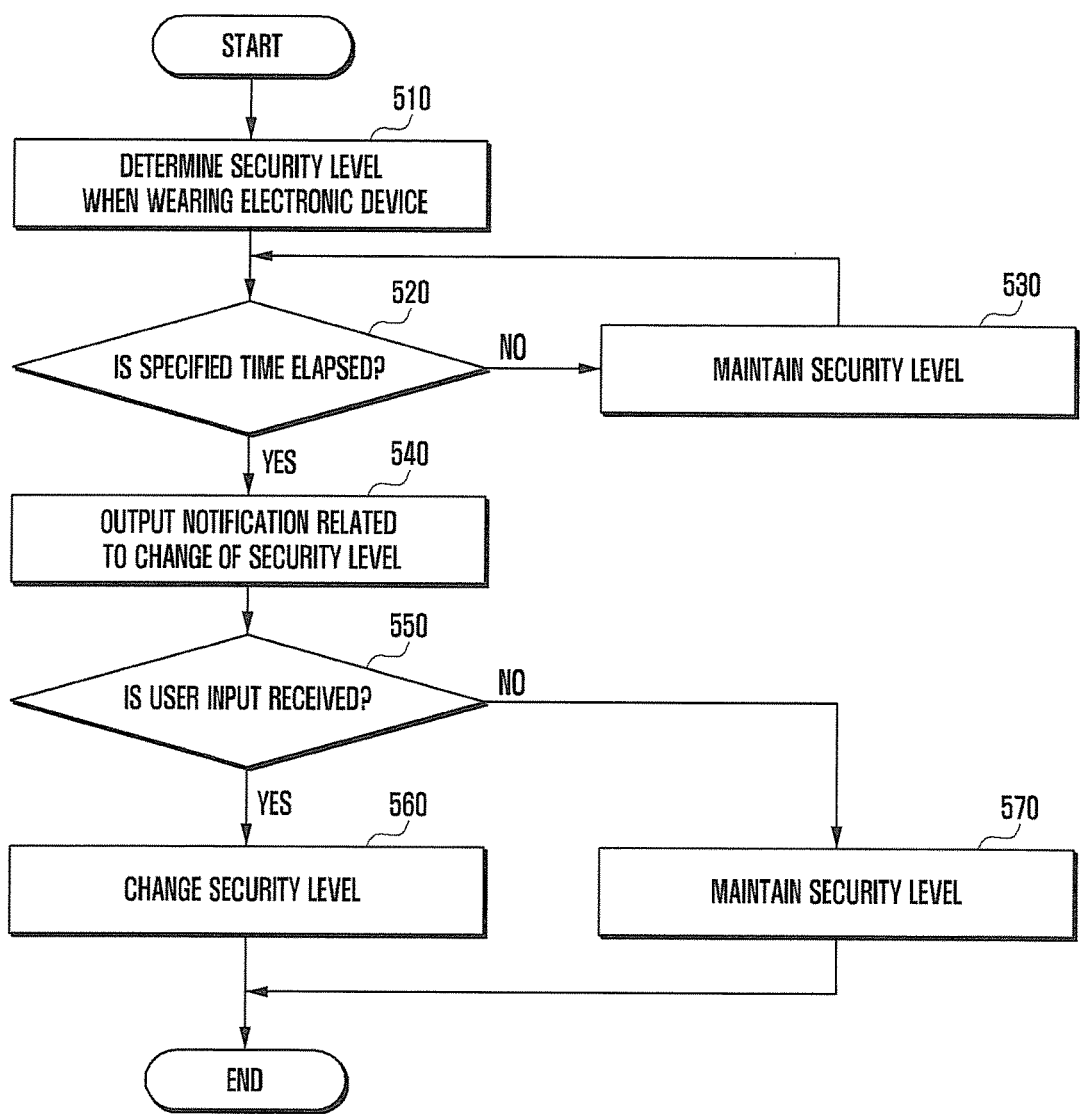
FIG. 5 is a flowchart illustrating a method for providing a security function according to various embodiments of the present disclosure.

FIG. 5 is a flowchart illustrating a method for providing a security function according to various embodiments of the present disclosure.

Referring to FIG. 5, at operation 510, an electronic device (e.g., the determination module 220) can determine the security level of an electronic device (e.g., the electronic device 100), when user wears the electronic device (e.g., the electronic device 100). In an embodiment of the present disclosure, an electronic device (e.g., the determination module 220) can determine whether user wears an electronic device (e.g., the electronic device 100). For example, when user wears an electronic device (e.g., the electronic device 100), an electronic device (e.g., the acquisition module 210) can receive biometric information such as user's body temperature, pulse, blood pressure, biological sound or temperature, and the like, detected through a biometric sensor. The electronic device (e.g., the determination module 220) can determine whether the user wears electronic device based on the received biometric information.

In an embodiment of the present disclosure, when it is determined that user wears an electronic device (e.g., the electronic device 100), an electronic device (e.g., the determination module 220) can determine the security level of an electronic device (e.g., the electronic device 100). The security level of an electronic device (e.g., the electronic device 100) can be the security level specified to the electronic device. For example, the security level specified to the electronic device can be a default security level specified to at least one application (e.g., a lock function application, etc.). Alternatively, the security level specified to the electronic device can be a security level specified to at least one application prior to the wearing of electronic device.

In an embodiment of the present disclosure, an electronic device (e.g., the determination module 220) can determine the security level specified to an electronic device (e.g., the electronic device 100), and change the security level of the electronic device, e.g., the security level specified to at least one application to be a minimum (or be released). For example, if the security level specified to the application prior to the wearing of electronic device is specified to the security level of Table 1, the security level can be changed to release the lock function without performing a touch and drag, a sweep or a long touch.

In an embodiment of the present disclosure, when it is determined that user wears an electronic device, an electronic device (e.g., the determination module 220) can determine the security level specified to an external electronic device (e.g., the electronic device 102, 104) located in a specified distance. For example, an electronic device can receive information related to the security level specified to external electronic device from the external electronic device paired with electronic device within a specified distance. An electronic device (e.g., the determination module 220) can determine the security level specified to an external electronic device (e.g., the electronic device 102, 104), based on the received information related to the security level specified to external electronic device.

At operation 520, an electronic device (e.g., the determination module 220) can determine whether specified time is elapsed in a state where user wears electronic device. In an embodiment of the present disclosure, specified time can be specified by the setting of user or specified by designer's intention in a design process.

At operation 530, an electronic device can control to maintain security level specified to at least one application, when an electronic device (e.g., the determination module 220) determines that specified time is not elapsed in a state where user wears electronic device.

At operation 540, an electronic device (e.g., the decision module 230) can output a notification relating to the change of the security level specified to at least one application, when an electronic device (e.g., the determination module 220) determines that specified time is elapsed in a state where user wears electronic device at operation 520. For example, an electronic device can output a notification whether to change the security level specified to at least one application (e.g., a lock function application, or the like) into a low security level, through various methods. For example, electronic device can output a notification whether to change the security level specified to at least one application into a low security level, by using a pop-up window, a quick panel or an audio module. However, the technical concept of the present disclosure is not limited thereto. In an embodiment of the present disclosure, an electronic device (e.g., the decision module 230) can output a notification whether to change the security level specified to at least one application into a high security level or to maintain the specified security level.

At operation 550, an electronic device (e.g., the acquisition module 210) can determine whether a user input to change the security level specified to at least one application is received.

At operation 560, if it is determined that the user input to change the security level specified to at least one application is received at operation 550, electronic device can change the specified security level based on the received user input. For example, electronic device can change the security level specified to at least one application into a low security level, based on the received user input.

At operation 570, if an electronic device (e.g., the determination module 220) determines that the user input to change the security level specified to at least one application is not received at operation 550, electronic device can maintain the security level specified to at least one application.

In an embodiment of the present disclosure, at least one of operation 540 to operation 570 can be omitted. For example, if specified time is elapsed in a state where user wears electronic device, the electronic device (e.g., decision module 230) can change the security level specified to at least one application into a low security level, regardless of a user input.

Figure 6:
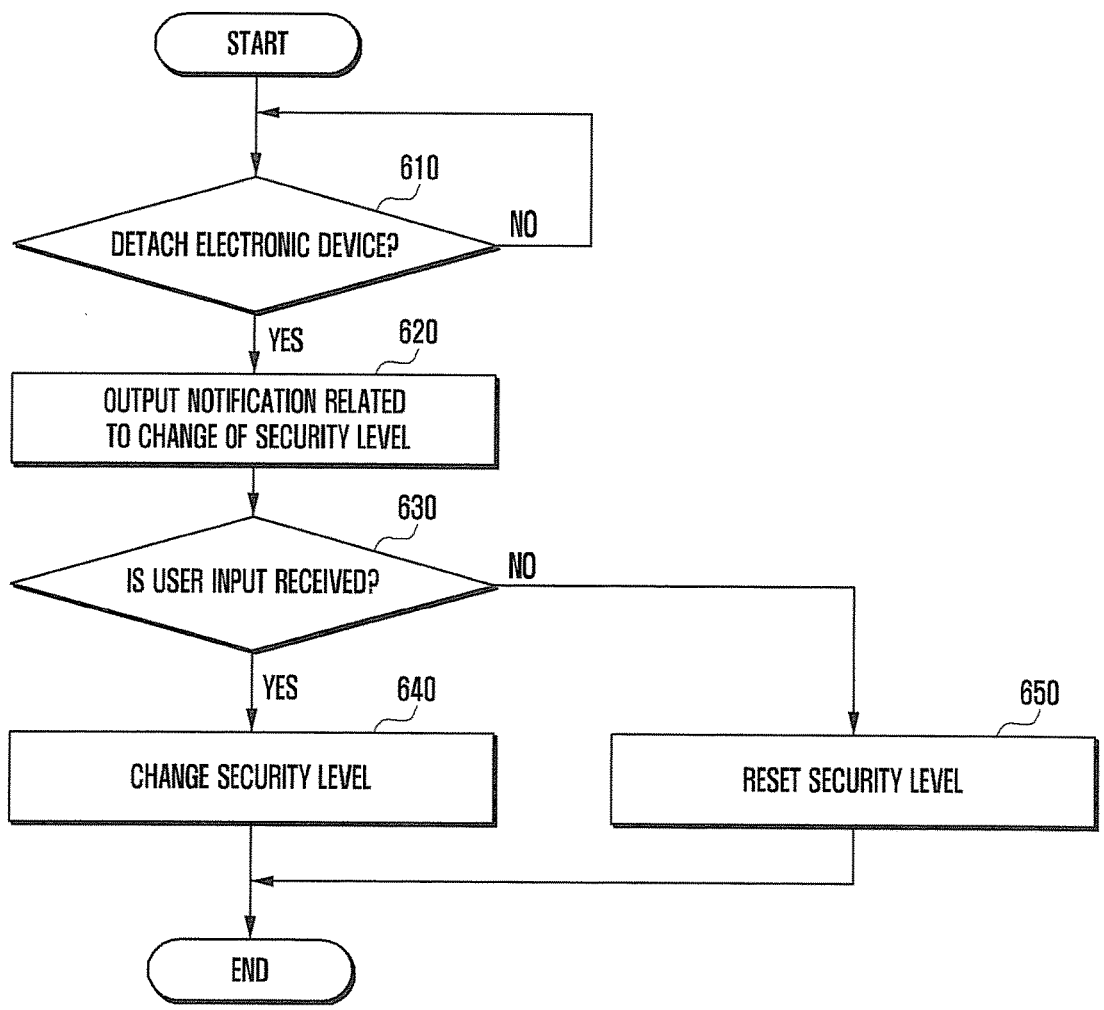
FIG. 6 is a flowchart illustrating a method for providing a security function according to various embodiments of the present disclosure.

FIG. 6 is a flowchart illustrating a method for providing a security function according to various embodiments of the present disclosure.

Referring to FIG. 6, at operation 610, an electronic device (e.g., the determination module 220) can determine whether user detaches (or removes) electronic device. For example, when user detaches an electronic device (e.g., the electronic device 100), biometric information such as user's body temperature, pulse, blood pressure, biological sound or temperature, and the like, received through a biometric sensor may not be received. An electronic device (e.g., the determination module 220) can determine that user has detached electronic device, if the biometric information is not received. However, the present disclosure is not limited thereto. Based on various information received from various sensors, apparatus or equipment, an electronic device can determine that user has detached electronic device. In an embodiment of the present disclosure, when it is determined that electronic device is not detached from user, electronic device can maintain the security level specified to at least one application, and repeatedly perform an operation to determine whether user has detached electronic device.

At operation 620, when an electronic device (e.g., the determination module 220) determines that user has detached electronic device at operation 610, an electronic device (e.g., the decision module 230) can output a notification relating to the change of the security level specified to at least one application. For example, an electronic device can output a notification whether to change the security level specified to at least one application (e.g., a lock function application, or the like) into a high security level, through various methods. For example, an electronic device (e.g., the decision module 230) can output a notification whether to change the security level specified to at least one application into a high security level, by using a pop-up window, a quick panel or an audio module. However, the technical concept of the present disclosure is not limited thereto. In an embodiment of the present disclosure, an electronic device can output a notification whether to change the security level specified to at least one application into a low security level or to maintain the specified security level.

At operation 630, an electronic device (e.g., the determination module 220) can determine whether a user input to change the security level specified to at least one application is received.

At operation 640, if it is determined that the user input to change the security level specified to at least one application is received at operation 630, electronic device can change the security level specified to at least one application based on the received user input. For example, an electronic device (e.g., the decision module 230) can change the security level specified to at least one application into a low security level, based on the received user input.

At operation 650, if an electronic device determines that the user input to change the security level specified to at least one application is not received at operation 640, electronic device can reset the security level specified to at least one application into reset. For example, electronic device can change the security level specified to at least one application into a default security level. However, the present disclosure is not limited thereto. In an embodiment of the present disclosure, an electronic device can maintain a current specified security level even when it is determined that the user input to change the security level specified to at least one application is received.

Figure 7:
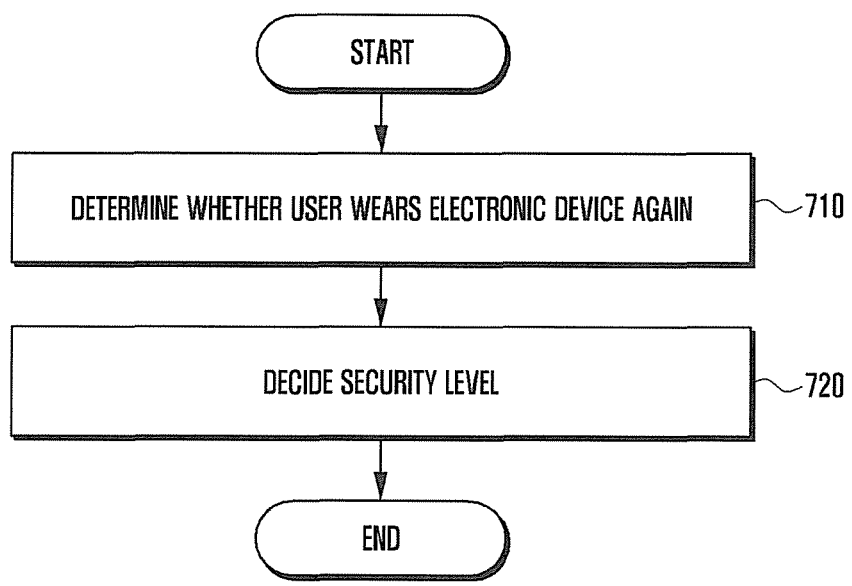
FIG. 7 is a flowchart illustrating a method for providing a security function according to various embodiments of the present disclosure.

FIG. 7 is a flowchart illustrating a method for providing a security function according to various embodiments of the present disclosure.

Referring to FIG. 7, at operation 710, an electronic device (e.g., the determination module 220) can determine whether user wears electronic device again. In an embodiment of the present disclosure, an electronic device can determine that user wears electronic device again, if user wears electronic device in a specified time. For example, when user wears electronic device in a specified time, an electronic device (e.g., the determination module 220) can receive biometric information such as user's body temperature, pulse, blood pressure, biological sound or temperature, and the like, detected through a biometric sensor included in an electronic device. An electronic device (e.g., the determination module 220) can determine whether user wears electronic device based on the received biometric information.

At operation 720, an electronic device can decide the security level specified to at least one application. In an embodiment of the present disclosure, an electronic device (e.g., the decision module 230) can decide the security level specified to at least one application as the specified security level before wearing an electronic device again, e.g., at the time of detaching an electronic device. In an embodiment of the present disclosure, an electronic device can decide the security level specified to at least one application as a default security level. In an embodiment of the present disclosure, an electronic device can receive a user input to decide any one of the specified security level at the time of detaching an electronic device or the default security level as a security level. For example, an electronic device (e.g., the decision module 230) can output a window to select any one of the specified security level at the time of detaching an electronic device or the default security level. When any one of the specified security level at the time of detaching an electronic device or the default security level is selected by user input, an electronic device (e.g., the decision module 230) can decide the selected security level as the security level of at least one application.

According to various embodiments of the present disclosure, the method for providing a security function can include an operation of obtaining a request for executing the function of application through the electronic device 100 while the electronic device is located within a specified distance from user, and determining the success or failure of the first authentication which is previously performed for the user in response to the request; and an operation of deciding whether to perform a second authentication for executing the function, based on the success or failure of the first authentication, wherein the operation of deciding can include an operation of performing the second authentication by using a security level lower than the security level related to the first authentication, based on the success of the first authentication.

According to various embodiments of the present disclosure, the operation of obtaining a request can include an operation of determining whether the electronic device is located within the specified distance from user, by using information detected through a sensor operatively coupled to the electronic device (e.g., the electronic device 100).

According to various embodiments of the present disclosure, the first authentication can be performed in the above mentioned state.

According to various embodiments of the present disclosure, the operation of obtaining a request can include an operation of obtaining the request while the above mentioned state is maintained after the first authentication is performed.

According to various embodiments of the present disclosure, the operation of determining the success or failure of the first authentication can include an operation of receiving the success or failure of the first authentication from an external device for the electronic device.

According to various embodiments of the present disclosure, the first authentication can be performed in the external device, in a state in which a distance between the electronic device and the external device of the electronic device is within a specified range.

According to various embodiments of the present disclosure, the operation of performing the second authentication can include an operation of performing the second authentication by using the low security level, in a state in which the distance is within the specified range, based on the success of the first authentication.

According to various embodiments of the present disclosure, the operation of performing the second authentication can include an operation of performing the second authentication by using the security level specified to the function, in a state in which the distance is not within the specified range.

According to various embodiments of the present disclosure, the operation of performing the second authentication can include an operation of performing the second authentication by using the security level higher than or equal to the security level related to the first authentication, based on the failure of the first authentication.

According to various embodiments of the present disclosure, the operation of performing the second authentication can include an operation of comparing the security level specified to the function with the security level related to the first authentication, and an operation of performing the second authentication by using the specified security level, on the basis that the specified security level is higher than or equal to the security level related to the first authentication, when the first authentication is successful.

According to various embodiments of the present disclosure, the operation of performing the second authentication can include an operation of changing the specified security level to be lower than the security level related to the first authentication, when the specified security level is lower than the security level related to the first authentication.

According to various embodiments of the present disclosure, the operation of performing the second authentication can include an operation of executing the function without performing the second authentication, when the first authentication is successful.

Various embodiments of the present disclosure can include an operation of determining whether the electronic device is worn by the user, and an operation of determining the security level specified to the electronic device, when it is determined that the electronic device is worn by the user.

Various embodiments of the present disclosure can include an operation of maintaining the specified security level in the state in which the electronic device is worn by the user.

Various embodiments of the present disclosure can include an operation of receiving an input whether to change the specified security level from the user, when the electronic device is worn by the user for a specified time.

Various embodiments of the present disclosure can include an operation of receiving an input whether to change the specified security level from the user, when the electronic device is detached from the user, and an operation of resetting the specified security level, when the input is not received from the user.

Various embodiments of the present disclosure can include an operation of setting the security level specified to the electronic device to a security level specified before wearing again or to the reset security level, when the electronic device is worn by the user again.

Figure 8:
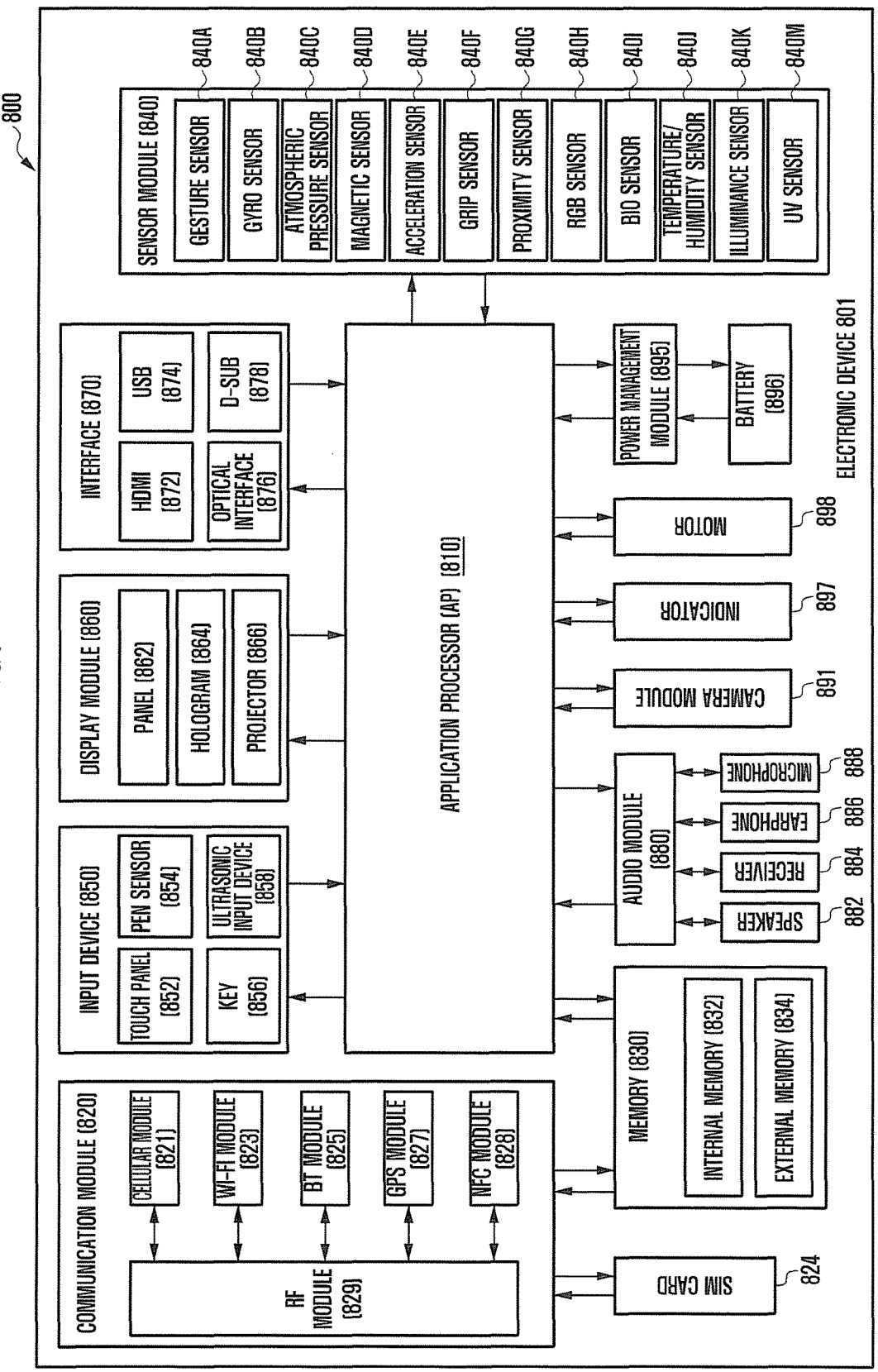
FIG. 8 illustrates a block diagram of an electronic device according to various embodiments of the present disclosure.

FIG. 8 is a block diagram illustrating a configuration of hardware according to an embodiment of the present disclosure.

Referring to FIG. 8, hardware 800 can be, for example, the electronic device 100 illustrated in FIG. 1. As illustrated in FIG. 8, the hardware 800 can include one or more application processors (AP) 810, a Subscriber Identification Module (SIM) card 824, a communication module 820, a memory 830, a sensor module 840, an input module 850, a display module 860, an interface 870, an audio module (e.g., audio coder/decoder (codec)) 880, a camera module 891, a power management module 895, a battery 896, an indicator 897, a motor 898 and any other similar and/or suitable components.

The AP 810 (e.g., the processor) can include one or more Application Processors (APs), or one or more Communication Processors (CPs).

The AP 810 can execute an Operating System (OS) or an application program, and thereby can control multiple hardware or software elements connected to the AP 810 and can perform processing and arithmetic operations on various data including multimedia data. The AP 810 can be implemented by, for example, a System on Chip (SoC). According to various embodiments of the present disclosure, the AP 810 can further include a Graphical Processing Unit (GPU) (not illustrated).

The SIM card 824 can be a card implementing a subscriber identification module, and can be inserted into a slot formed in a particular portion of the electronic device 100. The SIM card 824 can include unique identification information (e.g., Integrated Circuit Card IDentifier (ICCID)) or subscriber information (e.g., International Mobile Subscriber Identity (IMSI)).

The communication module 820 can be, for example, the communication module 160 illustrated in FIG. 1. The communication module 820 can include a Radio Frequency (RF) module 829. The communication module 820 can further include, for example, a cellular module 821, a Wi-Fi module 823, a Bluetooth (BT) module 825, a GPS module 827, a Near Field Communications (NFC) module 828. For example, the communication module 820 can provide a wireless communication function by using a radio frequency. Additionally or alternatively, the communication module 820 can include a network interface (e.g., a Local Area Network (LAN) card), a modulator/demodulator (modem), and/or the like for connecting the hardware 800 to a network (e.g., the Internet, a LAN, a Wide Area Network (WAN), a telecommunication network, a cellular network, a satellite network, a Plain Old Telephone Service (POTS), and/or the like).

The cellular module 821 can further include a Communication Processor (CP). The CP can control the transmission and reception of data by the communication module 820. As illustrated in FIG. 8, the elements such as the CP, the power management module 895, the memory 830, and the like are illustrated as elements separate from the AP 810. However, according to various embodiments of the present disclosure, the AP 810 can include at least some (e.g., the CP) of the above-described elements. The CP can manage a data line and can convert a communication protocol in the case of communication between the electronic device (e.g., the electronic device 100) including the hardware 200 and different electronic devices connected to the electronic device through the network.

The RF module 829 can be used for transmission and reception of data, for example, transmission and reception of RF signals or called electronic signals. Although not illustrated, the RF unit 829 can include, for example, a transceiver, a Power Amplifier Module (PAM), a frequency filter, a Low Noise Amplifier (LNA), and/or the like.

In addition, the RF module 829 can further include a component for transmitting and receiving electromagnetic waves in a free space in a wireless communication, for example, a conductor, a conductive wire, or the like.

The memory 830 can include an internal memory 832 and an external memory 834. The memory 830 can be, for example, the memory 130 illustrated in FIG. 1. According to various embodiments of the present disclosure, internal memory 832 can include, for example, at least one of a volatile memory (e.g., a Dynamic Random Access Memory (DRAM), a Static RAM (SRAM), a Synchronous Dynamic RAM (SDRAM), and/or the like), and a non-volatile memory (e.g., a One Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory, and/or the like). According to various embodiments of the present disclosure, the internal memory 832 can be in the form of a Solid State Drive (SSD). The external memory 834 can further include a flash drive, for example, a Compact Flash (CF), a Secure Digital (SD), a Micro-Secure Digital (Micro-SD), a Mini-Secure Digital (Mini-SD), an extreme Digital (xD), a memory stick, and/or the like.

The sensor module 840 can include, for example, at least one of a gesture sensor 840A, a gyro sensor 840B, an atmospheric pressure sensor 840C, a magnetic sensor 840D, an acceleration sensor 840E, a grip sensor 840F, a proximity sensor 840G, a Red, Green and Blue (RGB) sensor 840H, a biometric sensor 840I, a temperature/humidity sensor 840J, an illuminance sensor 840K, and a Ultra Violet (UV) sensor 840M. The sensor module 840 can measure a physical quantity and/or can detect an operating state of the electronic device 100, and can convert the measured or detected information to an electrical signal. Additionally/alternatively, the sensor module 840 can include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor (not illustrated), and/or the like. Additionally or alternatively, the sensor module 840 can include, for example, an E-nose sensor (not illustrated), an EMG sensor (not illustrated), an EEG sensor (not illustrated), an ECG sensor (not illustrated), a fingerprint sensor, and/or the like. The sensor module 840 can further include a control circuit (not illustrated) for controlling one or more sensors included therein.

The input module 850 can include a touch panel 852, a pen sensor 854 (e.g., a digital pen sensor), keys 856, and an ultrasonic input unit 858. The input module 850 can be, for example, the user input module 140 illustrated in FIG. 1. The touch panel 852 can recognize a touch input in at least one of, for example, a capacitive scheme, a resistive scheme, an infrared scheme, an acoustic wave scheme, and the like. In addition, the touch panel 852 can further include a controller (not illustrated). In the capacitive type, the touch panel 852 is capable of recognizing proximity as well as a direct touch. The touch panel 852 can further include a tactile layer (not illustrated). In this event, the touch panel 852 can provide a tactile response to the user.

The pen sensor 854 (e.g., a digital pen sensor), for example, can be implemented by using a method identical or similar to a method of receiving a touch input from the user, or by using a separate sheet for recognition. For example, a key pad or a touch key can be used as the keys 856. The ultrasonic input unit 858 enables the terminal to detect a sound wave by using a microphone (e.g., a microphone 888) of the terminal through a pen generating an ultrasonic signal, and to identify data. The ultrasonic input unit 858 is capable of wireless recognition. According to various embodiments of the present disclosure, the hardware 800 can receive a user input from an external device (e.g., a network, a computer, a server, and/or the like), which is connected to the communication module 830, through the communication module 830.

The display module 860 can include a panel 862, a hologram 864, a projector 866, and/or the like. The display module 860 can be, for example, the display module 150 illustrated in FIG. 1. The panel 862 can be, for example, a Liquid Crystal Display (LCD) and an Active Matrix Organic Light Emitting Diode (AM-OLED) display, and/or the like. The panel 862 can be implemented so as to be, for example, flexible, transparent, or wearable. The panel 862 can include the touch panel 852 and one module. The hologram 864 can display a three-dimensional image in the air by using interference of light. According to various embodiments of the present disclosure, the display module 860 can further include a control circuit for controlling the panel 862 or the hologram 864.

The interface module 870 can include an High-Definition Multimedia Interface (HDMI) module 872, a Universal Serial Bus (USB) module 874, an optical interface module 876, a D-subminiature (D-SUB) module 878, and/or the like. Additionally or alternatively, the interface 870 can include, for example, one or more interfaces for Secure Digital (SD)/MultiMedia Card (MMC) (not shown) or Infrared Data Association (IrDA) (not shown). The interface module 870 or any of its sub-modules can be configured to interface with another electronic device (e.g., an external electronic device), an input device, an external storage device, and/or the like.

The audio module 880 can encode/decode voice into electrical signal, and vice versa. The audio module 880 can, for example, encode/decode voice information that are input into, or output from, a speaker 882, a receiver 884, an earphone 886, and/or a microphone 888.

The camera module 891 can capture still images or video. According to various embodiments of the present disclosure, the camera module 891 can include one or more image sensors (e.g., front sensor module or rear sensor module; not shown), an Image Signal Processor (ISP, not shown), or a flash Light-Emitting Diode (flash LED, not shown).

The power management module 895 can manage electrical power of the hardware 800. Although not shown, the power management module 895 can include, for example, a Power Management Integrated Circuit (PMIC), a charger Integrated Circuit (charger IC), a battery fuel gauge, and/or the like.

The PMIC, for example, can be disposed in an integrated circuit or an SoC semiconductor. The charging method for the hardware 800 can include wired or wireless charging. The charger IC can charge a battery, or prevent excessive voltage or excessive current from a charger from entering the hardware 800. According to various embodiments of the present disclosure, the charger IC can include at least one of a wired charger IC or a wireless charger IC. The wireless charger IC can be, for example, a magnetic resonance type, a magnetic induction type or an electromagnetic wave type, and can include circuits such as, for example, a coil loop, a resonance circuit or a rectifier.

The battery gauge can measure, for example, a charge level, a voltage while charging, a temperature of battery 896, and/or the like. The battery 896 can supply power to, for example, the hardware 800. The battery 896 can be, for example, a rechargeable battery.

The indicator 897 can indicate one or more states (e.g., boot status, message status or charge status) of the hardware 800 or a portion thereof (e.g., the AP 811). The motor 898 can convert electrical signal into mechanical vibration. MCU 899 can control the sensor module 840.

Although not illustrated, the hardware 800 can include a processing unit (e.g., a Graphics Processing Unit (GPU)) for supporting a module TV. The processing unit for supporting a module TV can process media data according to standards such as, for example, Digital Multimedia Broadcasting (DMB), Digital Video Broadcasting (DVB), media flow, and/or the like.

According to various embodiments of the present disclosure, each of the above-described elements of the hardware 800 can include one or more components, and the name of the relevant element can change depending on the type of electronic device. According to various embodiments of the present disclosure, the hardware 800 can include at least one of the above-described elements. Some of the above-described elements can be omitted from the hardware 800, or the hardware 800 can further include additional elements. In addition, according to various embodiments of the present disclosure, some of the elements of the hardware 800 can be combined into one entity, which can perform functions identical to those of the relevant elements before the combination.

Figure 9:
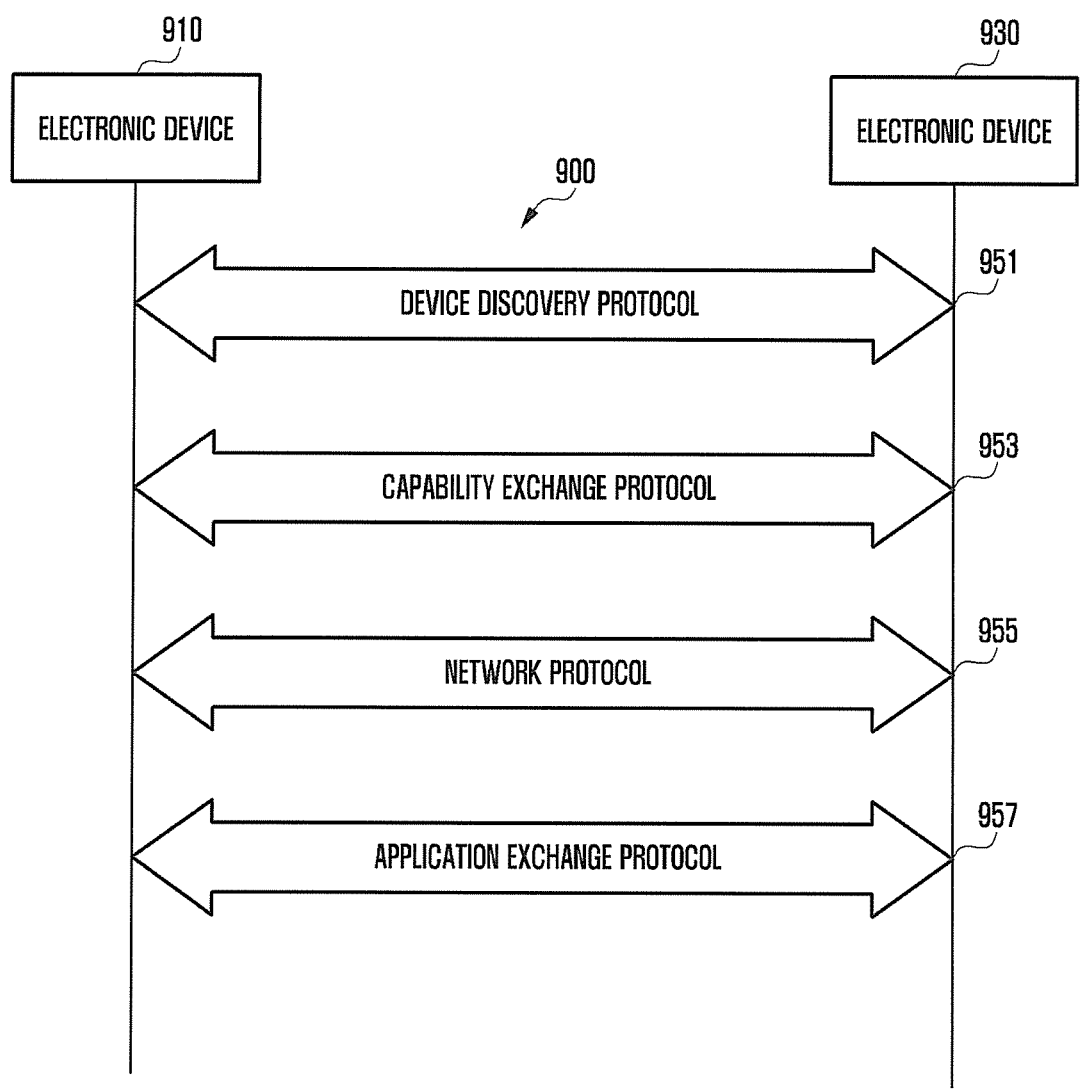
FIG. 9 illustrates a communication protocol between a plurality of electronic devices according to various embodiments of the present disclosure.

FIG. 9 illustrates a communication protocol between a plurality of electronic devices according to various embodiments of the present disclosure. For example, FIG. 9 illustrates a communication protocol 910 between an electronic device 910 and an electronic device 930 according to various embodiments of the present disclosure.

Referring to FIG. 9, the communication protocol 900 can include a device discovery protocol 951, a capability exchange protocol 953, a network protocol 955, and an application protocol 957.

The device discovery protocol 951 can be a protocol that allows the electronic devices (e.g., the electronic device 910 or the electronic device 930) to detect an external electronic device which can be connected thereto through short-range communication or connects the found external electronic device thereto. For example, the electronic device 910 (e.g., the electronic device 100) can detect the electronic device 930 (e.g., the electronic device 104) as a device, which can communicate with the electronic device 910, through a short-range communication method (e.g., Bluetooth and/or the like) using the device discovery protocol 951. The electronic device 910 can acquire and store identification information of the electronic device 930 detected through the device discovery protocol 951 for a communication connection with the electronic device 930. For example, the electronic device 910 can establish the communication connection with the electronic device 930 at least based on the identification information. The device discovery protocol 951 can be a protocol for authenticating a plurality of electronic devices. For example, the electronic device 910 can perform an authentication between the electronic device 910 and the electronic device 930 based on communication information (e.g., a Media Access Control (MAC) address, a Universally Unique IDentifier (UUID), a SubSystem IDentification (SSID), and an Information Provider (IP) address) for the connection with the electronic device 930.

The capability exchange protocol 953 can be a protocol for exchanging information related to a service function which can be supported by at least one of the electronic device 910 and the electronic device 930. For example, the electronic device 910 and the electronic device 930 can exchange information related to a service function currently provided by each of the electronic device 910 and the electronic device 930 through the capability exchange protocol 953. The information which can be exchanged between the electronic devices can include identification information indicating a particular service among a plurality of services which can be supported by the electronic device 910 and the electronic device 930. For example, the electronic device 910 can receive, from the electronic device 930, identification information of a particular service provided by the electronic device 930 through the capability exchange protocol 953. In this case, the electronic device 910 can determine whether the electronic device 910 can support the particular service based on the received identification information.

The network protocol 955 can be a protocol for controlling flows of data which is transmitted/received to provide a service linked between the electronic devices (e.g., the electronic device 910 and the electronic device 930) which are connected to communicate with each other. For example, at least one of the electronic device 910 and the electronic device 930 can control an error or data quality by using the network protocol 955. Additionally or alternatively, the network protocol 955 can determine a transport format of data transmitted/received between the electronic device 910 and the electronic device 930. Further, at least one of the electronic device 910 and the electronic device 930 can at least manage a session (e.g., connect or terminate a session) for a data exchange between the electronic devices by using the network protocol 955.

The application protocol 957 can be a protocol for providing a process or information for exchanging data related to a service provided to an external electronic device. For example, the electronic device 910 (e.g., the electronic device 100) can provide a service to the electronic device 930 (e.g., the electronic device 104 or the server 106) through the application protocol 957.

The communication protocol 900 can include a standard communication protocol, a communication protocol designated by an individual or organization (e.g., a communication protocol self-designated by a communication device manufacturing company or a network supplying company) or a combination thereof.

The term "module" used in embodiments of the present disclosure can refer to, for example, a "unit" including one of hardware, software, and firmware, or a combination of two or more thereof. The term "module" can be interchangeable with a term such as a unit, a logic, a logical block, a component, or a circuit. The "module" can be a minimum unit of an integrated component or a part thereof. The "module" can be a minimum unit for performing one or more functions or a part thereof. The "module" can be mechanically or electronically implemented. For example, the "module" according to the present disclosure can include at least one of an Application-Specific Integrated Circuit (ASIC) chip, a Field-Programmable Gate Arrays (FPGA), and a programmable-logic device for performing operations which has been known or are to be developed hereinafter.

According to various embodiments of the present disclosure, at least some of the devices (e.g., modules or functions thereof) or the method (e.g., operations) according to the present disclosure can be implemented by a command stored in a non-transitory computer-readable storage medium in a programming module form. When the command is executed by one or more processors (e.g., the processor), the one or more processors can execute a function corresponding to the command. The non-transitory computer-readable storage medium can be, for example, the memory 130. At least a part of the programming module can be implemented (e.g., executed) by, for example, the processor 210. At least a part of the programming module can include, for example, a module, a program, a routine, a set of instructions, and/or a process for performing one or more functions.

The non-transitory computer-readable recording medium can include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (e.g., programming module), such as a Read Only Memory (ROM), a Random Access Memory (RAM), a flash memory and the like. In addition, the program instructions can include high class language codes, which can be executed in a computer by using an interpreter, as well as machine codes made by a compiler. The aforementioned hardware device can be configured to operate as one or more software modules in order to perform the operation of various embodiments of the present disclosure, and vice versa.

The module or the programming module according to various embodiments of the present disclosure can include at least one or more of the above-described elements, omit some of the above-described elements, or can further include additional elements. The module, the programming module or operations performed by other element according to various embodiments of the present disclosure can be executed by a sequential, a parallel, an iterative, or a heuristic method. In addition, some operations can be executed in a different order, or omitted, or can add other operation.

According to various embodiments of the present disclosure, in a recording medium storing instructions, the instructions are set to cause at least one processor to perform at least one operation when the instructions are executed by the at least one processor, and the at least one operation may include an operation of obtaining a request for executing the function of application through the electronic device 100 while the electronic device is located within a specified distance from user, and determining the success or failure of the first authentication which is previously performed for the user in response to the request; and an operation of deciding whether to perform a second authentication for executing the function, based on the success or failure of the first authentication, wherein the operation of deciding may include an operation of performing the second authentication by using a security level lower than the security level related to the first authentication, based on the success of the first authentication.

The method and the apparatus for providing a security function according to Various embodiments of the present disclosure may provide, for example, a user authentication method (e.g., unlock screen by touch) of low security level that is adjusted based on the user authentication result in the electronic device, thereby improving convenience in using the electronic device.

The method and the apparatus for providing a security function according to Various embodiments of the present disclosure may provide, for example, a user authentication method (e.g., unlock screen by touch) of high security level that is adjusted based on the user authentication result in the electronic device such that user can safely use the electronic device.

Although embodiments of the present disclosure have been described in detail hereinabove, it should be clearly understood that many variations and modifications of the basic inventive concepts herein taught which may appear to those skilled in the present art will still fall within the spirit and scope of the present disclosure, as defined in the appended claims.

What is claimed is:

1. A method comprising:
   detecting a request for executing a function of an application through an electronic device if the electronic device is located within a predetermined distance from a user;
   identifying success or failure of a first authentication performed before the detection of the request, in response to the request; and
   determining a security level related to a second authentication for the executing the function of the application based on the success or failure of the first authentication, and
   performing the second authentication using the determined security level,
   wherein determining the security level related to the second authentication comprises:
      changing the security level related to the second authentication to a security level lower than a security level related to the first authentication if the success of the first authentication is identified; and
      changing the security level related to the second authentication to a security level higher than the security level related to the first authentication if the failure of the first authentication is identified.

2. The method of claim 1, further comprising determining whether the electronic device is located within the predetermined distance from user, by using information detected through a sensor operatively coupled to the electronic device.

3. The method of claim 1, wherein the first authentication is performed when the electronic device is located within the predetermined distance from user.

4. The method of claim 3, wherein the electronic device remains within the predetermined distance from the user after the first authentication is performed.

5. The method of claim 1, wherein identifying the success or failure of the first authentication comprises receiving the success or failure of the first authentication from an external device for the electronic device.

6. The method of claim 1, wherein the first authentication is performed in an external device when a distance between the electronic device and the external device is within a specified range.

7. The method of claim 1, wherein determining a security level related to the second authentication comprises:
   comparing a security level assigned to the function with the security level related to the first authentication; and
   if the assigned security level is higher than or equal to the security level related to the first authentication and the success of the first authentication is identified, performing the second authentication by using the assigned security level.

8. The method of claim 7, wherein determining a security level related to the second authentication comprises adjusting the assigned security level to be lower than the security level related to the first authentication if the assigned security level is lower than the security level related to the first authentication.

9. The method of claim 1, further comprising executing the function without performing the second authentication if the first authentication is successful.

10. The method of claim 1, further comprising:
    determining whether the electronic device is worn on a user; and
    determining a security level assigned to the electronic device in response to the electronic device being worn on the user.

11. The method of claim 10, further comprising receiving an input whether to adjust the assigned security level from the user, when the electronic device is worn on the user for a time.

12. The method of claim 10, further comprising:
    receiving an input whether to change the assigned security level from the user when the electronic device is detached from the user; and resetting the assigned security level unless the input is received from the user.

13. The method of claim 12, further comprising setting the security level assigned to the electronic device to a security level specified before wearing again or to the reset security level, when the electronic device is worn by the user again.

14. An electronic device comprising:
a processor configured to:
detect a request for executing a function of an application through the electronic device, if the electronic device is located within a predetermined distance from a user;
identify a success or failure of a first authentication performed before the detection of the request in response to the request;
determine a security level related to a second authentication for the executing the function of the application based on the success or failure of the first authentication; and
perform the second authentication using the determined security level,
wherein the processor is further configured to:
change the security level related to the second authentication to a security level lower than a security level related to the first authentication if the success of the first authentication is identified; and
change the security level related to the second authentication to a security level higher than the security level related to the first authentication if the failure of the first authentication is identified.

15. The electronic device of claim 14, wherein the electronic device is worn on the user.

16. The electronic device of claim 14, wherein the processor is configured to receive the success or failure from an external device for the electronic device.

17. The electronic device of claim 14, wherein the processor is configured to obtain the success or failure of the first authentication which is performed in an external electronic device when the electronic device and an external device for the electronic device are paired.

18. The electronic device of claim 14, wherein the processor is configured to perform the second authentication by using the low security level in response to the success of the first authentication when the electronic device and an external device are paired.

* * * * *